Patented Aug. 27, 1935

2,012,372

UNITED STATES PATENT OFFICE 2,012,372

SODIUM PHENYL AND ITS DERIVATIVES AND PROCESS OF PREPARING THEM

Max Bockmühl and Gustav Ehrhart, Frankfort-on-the-Main, Germany, assignors to Winthrop Chemical Company, Inc., New York, N. Y., a corporation of New York No Drawing. Application April 18, 1932, Serial No. 606,071. In Germany April 29, 1931

5 Claims. (Cl. 260—168)

The present invention relates to sodium phenyl and its derivatives and to a process of preparing them.

It is known that a number of organic compounds are obtainable by causing sodium to act upon bromobenzene in the presence of various reagents (cf. "Berichte der deutschen Chemischen Gesellschaft", 1922, 2889; Am. Chem. J., volume 29, 1903, page 588). It is furthermore known to cause sodium phenyl which has been obtained by causing sodium to act upon mercury diphenyl $_2$Hg, to act upon substances containing reactive groups or atoms (Acree, American Chemical Journal, volume 29, 1903, pages 588 to 609). But these processes are not applicable for the manufacture of organic compounds on a technical scale as in both of them the reactions occur in more than one direction so that only a comparatively small yield of the final products is obtained; moreover, mercury diphenyl is obtained only with difficulty.

Now we have found that by causing sodium to act upon aromatic chloro-compounds of the general formula $$Cl-C_6H_4-X$$

wherein X stands for hydrogen or a substituent of the group consisting of alkyl and dialkyl-amino, aromatic sodium compounds are obtained with a good yield. By using these compounds much better results in the manufacture of various compounds can be obtained than in the known methods. The yields of the final products are much higher than in the known methods, and the reactions occur in a very distinct way without formation of by products, so that the new process is of value for cheaply preparing various products on a technical scale.

The process may be carried out by causing sodium to act upon a chlorophenyl compound of the above formula in the presence of an inert organic solvent, for example, in the presence of hydrocarbons, such as benzene, hexahydrobenzene or ligroin, or of a mixture of such organic solvents. It is advantageous to eliminate any moisture present during the reaction. The reaction is preferably carried out at a temperature not exceeding about 60° C. It has been found advantageous to keep the temperature between about 15° C. and about 40° C.

After the reaction between the chlorophenyl compound and sodium is finished, the sodium phenyl compound which is formed hereby, as a substance insoluble in benzene and the other inert organic solvents suitable for the process, may be separated from the solution. The oxygen of the air must not be allowed to come in contact with the sodium phenyl compound since, for instance, sodium phenyl is known to be a pyrophorus substance. The isolated sodium phenyl compound may be used for further reactions.

For the practical use of the sodium phenyl compounds it is not necessary to separate the compounds from the solution. It is advantageous to use the solution containing the sodium phenyl compounds in a suspended form immediately for performing further reactions.

The sodium phenyl compounds are, especially in the form of their suspensions contained in the solutions as described above, of a high reactivity. By causing the sodium phenyl compounds to act upon substances containing reactive groups or atoms a great number of different compounds can be obtained. Substances suitable for performing these reactions are, for example, carbon dioxide or sulfur dioxide, alkyl halides, nitriles, aromatic nitro compounds, acid anhydrides, compounds containing reactive hydrogen atoms which are able to be replaced by alkali metal, etc. The yields obtained when performing these reactions are in every case very high. For instance, by introducing carbon dioxide into a benzene solution containing sodium phenyl there are obtained sodium benzoate and benzoic acid respectively with an almost theoretical yield (up to 95–98 per cent. of the theoretical yield). As the sodium phenyl compounds are obtained from aromatic chloro-compounds with a much higher yield than for instance by the known process from the corresponding bromo-compounds, the new process permits the manufacture of various products with a far better yield than can be obtained by starting from the corresponding bromo-compound, which furthermore is not so easily and cheaply accessible as the chloro-compound. When preparing, for instance, benzoic acid in the aforesaid manner from bromo-benzene, a yield of only 20–40 per cent. of the theoretical yield is obtained, whereas the present process yields up to 98 per cent.

It is also obvious that, for instance, sodium phenyl prepared from chlorobenzene is much more easily accessible than sodium phenyl obtained according to another known process from mercury diphenyl. Whereas the difficulties and high expenses connected with the preparation of this latter substance under no circumstances would allow one to use sodium phenyl prepared in this manner on a technical scale, the present process is applicable for the technical manufacture of a number of different products. Besides this fact the yields of the product obtained by using, for instance, sodium phenyl prepared according to the present process, are remarkably higher than by the manufacture of the same compounds with sodium phenyl prepared from mercury diphenyl; for instance, benzoic acid is obtained according to this latter method with a yield of 65 per cent. of the theoretical yield (cf. American Chemical Journal, volume 29, 1903, page 600: 4.5 grams of pure benzoic acid instead of a theoretical yield of 6.9 grams). According to the present process a yield of a pure product up to 98 per cent. of the theoretical yield is obtained in a much simpler and cheaper way.

It is not necessary to carry out the reaction between the chlorophenyl compound and sodium in a separate phase and then to add the compounds containing reactive groups or atoms. It has been found to be advantageous in some cases to carry out the reaction between the chlorophenyl compound and sodium in the presence of the compound upon which the sodium phenyl compound formed by the said reaction is intended to act. For instance, sodium may be caused to act upon chlorobenzene and in the same moment in which the reaction begins carbon dioxide can be introduced until the reaction is finished. By this modification of the process it is made certain that all of the aromatic sodium compound is used for its further function in the moment of its formation.

The following examples illustrate the invention.

1. 23 grams of sodium in 250 cc. of benzene are mixed with 56 grams of chlorobenzene. The temperature is kept at between 15° C. and 30° C., while stirring and excluding atmospheric moisture. As soon as the reaction is complete, carbon dioxide is introduced until the alkaline reaction has disappeared. The mass is then poured into water and separated. On acidifying the aqueous portion with hydrochloric acid, 56 grams of benzoic acid separate in a crystalline form. After being filtered by suction and dried, it melts at 119° C.–120° C.

2. 11.5 grams of sodium in 125 cc. of benzene and 28 grams of chlorobenzene are treated as indicated in Example 1. As soon as the reaction is complete, 33 grams of diethylaminoethyl chloride are introduced, while strongly cooling. After the whole quantity has been added, the mass is heated to boiling temperature for half an hour. It is then poured into water and the benzene portion is separated. It is dried with caustic alkali, filtered and the benzene is distilled. The residue is distilled in a vacuum and the diethylaminoethylbenzene distills at 88° C.–90° C. under 2 mm. pressure. The yield amount to 26 grams.

3. 11.5 grams of sodium, 31 grams of para-chlorotoluene and 120 cc. of benzene are caused to react as indicated in Example 1. As soon as the reaction is complete carbon dioxide is introduced until the alkaline reaction has disappeared. The mass is further worked up as described in Example 1. 30 grams of para-toluic acid are obtained; it melts at 177° C.

4. 11.5 grams of sodium, 30 grams of chlorobenzene and 120 cc. of benzene are caused to react as indicated in Example 1, and 21 grams of benzonitrile are added thereto, drop by drop, while cooling. When the reaction is complete, the whole is stirred for an hour at room temperature, then poured into water and the benzene portion is separated. The residue remaining after distillation of the benzene is boiled for some time with dilute hydrochloric acid, cooled and extracted with ether. On distilling the ether, 25 grams of benzophenone are obtained; it melts at 47° C.

5. 11.5 grams of sodium, 30 grams of chlorobenzene and 120 cc. of benzene are caused to react as indicated in Example 1, and 31 grams of beta-naphthonitrile, dissolved in 60 cc. of dry benzene, are added thereto drop by drop. The mass is further worked up as described in Example 4, whereupon 30 grams of beta-naphthophenone are obtained which melts at 82° C. and boils at 216° C.–218° C. under 7 mm. pressure.

6. 11.5 grams of sodium, 30 grams of chlorobenzene and 120 cc. of benzene are caused to react as indicated in Example 1, and 34 grams of diphenylmethane are added thereto. The whole is allowed to stand for 24 hours and then heated for some hours at 60° C.–70 C. Carbon dioxide is then introduced until the alkaline reaction has disappeared. The mass is further worked up as described in Example 1. Diphenylacetic acid is obtained which is contaminated with a small amount of benzoic acid. The yield amounts to 30 grams.

7. 11.5 grams of sodium, 30 grams of chlorobenzene and 120 cc. of benzene are caused to react as indicated in Example 1, and 28 grams of nitrobenzene, diluted with 30 cc. of benzene, are introduced, drop by drop. The very violent reaction is moderated by strongly cooling. After the reaction is complete, the whole is stirred for two hours, poured into water and the aqueous portion is separated. It is treated with dilute hydrochloric acid until the reaction is acid to Congo paper and then extracted with ether. After distillation of the ether, 22 grams of phenol are obtained.

8. 11.5 grams of sodium, 30 grams of chlorobenzene and 120 cc. of benzene are caused to react as indicated in Example 1, and dry sulfur dioxide is then introduced until the acid reaction to Congo paper has disappeared. The mass is further worked up as described in Example 1, whereupon 24 grams of benzenesulfinic acid are obtained which has the known properties.

9. 11.5 grams of sodium, 120 cc. of benzene and 28 grams of chlorobenzene are mixed and stirred. As soon as the reaction sets in, carbon dioxide is slowly introduced. It is advisable to cool so that the temperature is kept at between 20° C. and 30° C. In the course of 3–4 hours, the reaction is complete. The reaction product is poured into water, the benzene is separated and the aqueous portion is treated with hydrochloric acid until the reaction is acid to Congo paper. The benzoic acid is separated. The yield amounts to 30 grams.

10. 11.5 grams of sodium and 120 cc. of benzene are mixed, while stirring, and 28 grams of chlorobenzene are introduced into the mixture, drop by drop. As soon as the reaction sets in, carbon dioxide is slowly introduced at 20° C.–30° C. The mass is further worked up as described in Example 9, whereupon 30 grams of benzoic acid are obtained.

11. 11.5 grams of sodium, 120 cc. of benzene and 31 grams of para-chlorotoluene are mixed and carbon dioxide is slowly introduced into the mixture. It is preferable to cool so that the temperature is kept at between 20° C. and 30° C. The mass is further worked up as described in Example 9, whereupon 33 grams of para-toluic acid are obtained.

12. 11.5 grams of sodium and 120 cc. of benzene are mixed, while stirring, and 39 grams of para-chlorodimethylaniline, dissolved in benzene, are introduced into the mixture, drop by drop. As soon as the reaction begins, carbon dioxide is slowly introduced and the temperature is kept at between 20 C. and 30° C. by cooling. After 6-7 hours the reaction is complete. The product is poured into water, the benzene is separated and the aqueous extract is rendered acid by means of acetic acid. The para-dimethyl-aminobenzoic acid separates. It is filtered by suction, washed with water and dried. The yield amounts to 40 grams.

13. 11.5 grams of sodium, 80 cc. of benzene, 80 cc. of ligroin and 30 grams of chlorobenzene are caused to react as indicated in Example 1. The reaction mixture is strongly cooled and 25 grams of acetic anhydride are introduced, drop by drop. After the very violent reaction is complete, the mass is poured into water and the benzene portion is separated. It contains 20 grams of acetophenone.

14. 11.5 grams of sodium, 120 cc. of benzene and 30 grams of chlorobenzene are caused to react as indicated in Example 1, and 26 grams of phenylisocyanate are then introduced, drop by drop, while cooling. After working up, 38 grams of benzanilide are obtained.

15. 11.5 grams of sodium are covered with 125 cc. of dry benzene and a mixture of 35.5 grams of camphor and 30 grams of chlorobenzene is introduced, drop by drop, while stirring. The reaction temperature must not exceed 30° C. After 4-5 hours, all the sodium will have been consumed. 33 grams of diethylaminoethylchloride are then added, drop by drop, while cooling, and, after the reaction is complete, the mass is heated for an hour at 60° C. It is then poured into water, the aqueous extract is separated and the diethylaminoethylcamphor is extracted from the benzene solution by means of dilute hydrochloric acid. The mass is again rendered alkaline and extracted with ether; after distillation of the ether, the diethylaminoethylcamphor distils at 125° C.-130° C. at 7 mm. pressure. The yield amounts to 35 grams.

16. 33 grams of sodium are covered with 250 grams of benzene and 71 grams of camphor mixed with 60 grams of chlorobenzene are added thereto, drop by drop, as indicated in Example 15. After the reaction is completed, 38 grams of allyl chloride, mixed with 50 cc. of benzene, are introduced, drop by drop, and after the reaction is complete, the whole is heated for 1 hour at 50° C.-60° C. It is then poured into water and the benzene portion is separated. After distillation of the benzene the residue is fractionated in a vacuum, whereupon the allyl camphor distils at 92° C.-96° C. at 4 mm. pressure.

17. 23 grams of sodium are covered with 250 cc. of benzene and mixed with a mixture of 71 grams of camphor and 60 grams of chlorobenzene as indicated in Example 15. Carbon dioxide is introduced until the alkaline reaction has disappeared. 200 cc. of water are added and the mixture is stirred until a clear solution is obtained. The aqueous extract is separated and the clear solution is acidified with hydrochloric acid. The campho-carboxylic acid which separates is filtered by suction. The yield amounts to 65 grams.

18. 46 grams of sodium, 60 grams of chlorobenzene and 400 cc. of benzene are caused to react as indicated in the preceding examples; 56 grams of butyric nitrile are then introduced into the reaction mixture so that the temperature does not exceed 4° C.-5° C. After the reaction is complete, 85 grams of ethyl bromide are introduced, drop by drop, at 0° C.-10° C. After working up, 30 grams of diethylacetonitrile are obtained.

19. 11.5 grams of sodium, 120 cc. of benzene and 30 grams of chlorobenzene are caused to react, 27 grams of diethylallylacetonitrile are then added and the whole is heated for some hours. It is then poured into water and the benzene extract is extracted with dilute hydrochloric acid. It is then rendered alkaline and extracted with ether. After distillation of the ether, the diethylallylacetophenone-imine distils at 145° C.-147° C. at 10 mm. pressure. It has the following constitution:

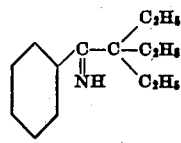

20. Upon 11.5 grams of sodium there are poured 120 cc. of benzene and 31 grams of meta-chlorotoluene; as soon as the reaction sets in, carbon dioxide is slowly introduced as indicated in Example 11. After working up, 30 grams of meta-toluic acid are obtained.

21. 11.5 grams of sodium, 120 cc. of ligroin and 28 grams of chlorobenzene are treated with carbon dioxide as indicated in Example 9. After working up, 27 grams of benzoic acid are obtained.

We claim:

1. The process which comprises causing sodium to act in the presence of an inert organic solvent upon an aromatic chloro-compound of the following general formula

wherein X stands for hydrogen or a substituent of the group consisting of alkyl and dialkylamino at a temperature of about 15° C. to about 40° C.

2. The process which comprises causing sodium to act in the presence of an inert hydrocarbon upon an aromatic chloro-compound of the following general formula

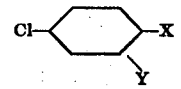

wherein X stands for hydrogen or a substituent of the group consisting of methyl and dimethylamino, Y stands for hydrogen or methyl in which latter case X stands for hydrogen only at a temperature of about 15° C. to about 40° C.

3. The process which comprises causing sodium to act in the presence of an inert hydrocarbon of the group consisting of benzene, ligroin and mixtures thereof upon chlorobenzene at a temperature of about 15° C. to about 40° C.

4. The process which comprises causing sodium to act in the presence of an inert hydrocarbon of the group consisting of benzene, ligroin and mixtures thereof upon chlorobenzene at a temperature of about 15° C. to about 40° C. and under elimination of any moisture during the reaction.

5. The process which comprises causing sodium to act in the presence of benzene upon chlorobenzene at a temperature of about 15° C. to about 40° C. and under elimination of any moisture during the reaction.

MAX BOCKMÜHL.
GUSTAV EHRHART.